UNITED STATES PATENT OFFICE 2,341,413

PROCESS OF PREPARING COATINGS AND THE MATERIALS THUS OBTAINED

Walter Pense and Herbert Bestian, Frankfort-on-the-Main, Germany; vested in the Alien Property Custodian No Drawing. Application October 12, 1940, Serial No. 361,011. In Germany September 27, 1939

7 Claims. (Cl. 117—164)

The present invention relates to a process of preparing coatings fast to water and rubbing and the materials thus obtained.

It is known that it is possible to apply on materials of fibrous structure such as leather, artificial leather, pasteboard, vulcanized fiber, tightly woven fabrics and similar materials coatings from albuminous substances, for instance, albumin or casein, containing pigments or dyestuffs, softeners such as Turkey red oil and, if desired, resins such as, for instance, shellac. These coatings, however, are not fast to water and to rubbing. Their fastness properties may be improved by treating them with formaldehyde. For many purposes, however, even this improved fastness is not sufficient. Moreover, also coatings from water-soluble cellulose compounds or artificial resins, after treatment with formaldehyde, have only an incomplete fastness to water and to rubbing. A further disadvantage of this process lies in the fact that the working with aqueous formaldehyde solutions—especially in case a spraying apparatus, much favoured in practice, is used—is very irksome on account of the penetrating smell of formaldehyde.

Now, we have found that coatings fast to water and to rubbing are obtained on materials of fibrous structure, especially leather, artificial leather, pasteboard, vulcanized fiber and tightly woven fabrics by applying coatings of albuminous substances, water-soluble cellulose compounds or water-soluble artificial resins containing, if desired, pigments, dyestuffs, softeners and resins on the said materials and treating the materials thus coated with compounds of the general formulae:

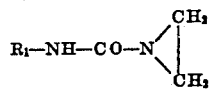

or

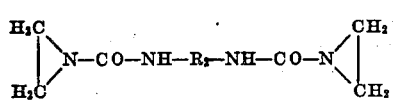

wherein $R_1$ and $R_2$ stand for aliphatic or carbocyclic radicals, or a homologue or derivative thereof.

There are particularly used compounds in which $R_1$ represents an aliphatic or cycloaliphatic radical of low molecular weight, for instance, the chlorethyl or cyclohexyl radical and, furthermore, compounds in which $R_2$ stands for a bivalent alkylene radical, for instance, the tetramethylene radical, the hexamethylene radical, the octamethylene radical or a cycloalkylene radical such as

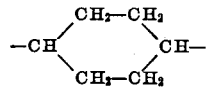

or a phenylene radical such as

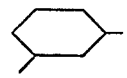

The compounds which come into question are obtained from the corresponding isocyanic or diisocyanic esters by reaction with ethylene imine. By using instead of ethylene imine propylene imine, butylene imine, dodecylene imine, phenylethylene imine or an analogous imine compound there are obtained homologues of the compounds illustrated above by formulae.

The process of the present invention is carried out by first applying in the usual manner coatings on materials of fibrous structure. There may be used albuminous substances such as egg albumin, casein, blood or water-soluble cellulose derivatives, such as methyl cellulose, hydroxy-oxethylmethyl cellulose, salts of the cellulose glycolic acid obtained by reaction of cellulose sodium with chloracetic acid, or the like. The coatings may also be prepared from water-soluble artificial polyvinyl resins, for instance water-soluble polymerization products, especially from polyvinyl alcohol and the derivatives thereof which are still soluble in water, from salts of polymerization products containing acid groups such as sodium polyacrylate, and from interpolymers containing carboxylic acid groups such as the interpolymer from crotonic acid and vinyl acetate, furthermore, from the saponification products from interpolymers of maleic anhydride and other olefinic compounds such as styrene, vinyl-butylether or the like. It is also possible to add to the coating agents which may be applied in admixture with each other colored or uncolored pigments of inorganic or organic nature as well as dyestuffs. Softening agents, resins or like substances may also be added in the usual manner.

The coatings may be applied to the material of fibrous structure, for instance leather, in one or more stages. It is also possible to apply first a so-called coating color and then a finish. After application of each of the several coats or when the coating is finished, the material is treated according to the present invention with the above mentioned mono- or di-urea derivatives in order to obtain a good fixation of the coatings on the material of fibrous structure. The thus treated material is then finished as indicated more particularly in the examples.

The coatings obtainable by the present invention are distinguished by a very good fastness. For instance, a coating obtained by means of casein and hardened with formaldehyde or a substance yielding formaldehyde, such as methylolformamide, when rubbed with a moist flap will be rubbed off to a considerable extent. In case the coating is colored, the color will disappear or change its shade at places on rubbing. Contrary thereto, the coatings obtained by the after-treatment according to the present invention are entirely fast to rubbing off. Moreover, the compounds used are completely odorless whereas the working with formaldehyde often involves disadvantages.

The following examples illustrate the invention:

(1) A water-soluble coating for leather, that is to say a coating color, is prepared as follows:

| | Grams |
|---|---|
| Casein | 15 |
| Red iron oxide | 20 |
| The dyestuff Nr. 296 (Schultz, Farbstofftabellen, 7th ed. 1931) | 5 |
| Turkey red oil (50%) | 20 |
| Ammonia (25%) | 4 | are ground with addition of water to form a uniform paste and finally the whole is made up with water to 1000 grams. This coating color is applied by means of a brush or a spray gun on chrome-tanned calf which has been prepared in the usual manner for finishing. If desired, several coatings of the same mixture may be applied with intermediate drying until the material is sufficiently covered. Subsequently a finish of the following composition is applied:

| | Grams |
|---|---|
| Egg albumin solution (10%) | 100 |
| Casein solution (10%) | 100 |
| Fresh beef blood which has been passed through a sieve | 50 | made up with water to 1000 grams. After the drying of the coating, the leather is glazed and sprayed with a solution of 5% strength of the following compound:

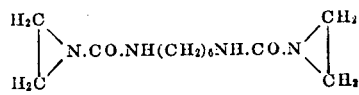

The leather is again dried and ironed. The coating on the leather has a very good fastness to rubbing and to water which is essentially better than that of a coating treated with a formaldehyde solution of 10% strength.

(2) A coating for artificial leather (leather of fibrous structure) is prepared from the following mixture:

| | Grams |
|---|---|
| Methyl cellulose solution (5%) | 80 |
| An aqueous solution of 15% strength of a salt of an interpolymer from styrene and maleic anhydride | 20 |
| Turkey red oil (50%) | 12 |
| Sulfonated neat's-foot oil | 2 |
| Titanium white | 125 |

The mixture is uniformly ground to form a paste while water is added; the whole is then made up with water to 1000 grams and applied as indicated in Example 1.

The following mixture is used for finishing:

| | Grams |
|---|---|
| Methyl cellulose (5%) | 30 |
| A solution of 20% strength of a salt of an interpolymer from vinylbutylether and maleic anhydride | 70 |
| Turkey red oil (50%) | 4 |
| Sulfonated neat's-foot oil | ½ | made up with water to 1 liter.

The finished material is hardened with a solution of 5% strength of the following compound:

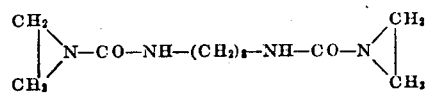

dried and glazed. If a high gloss is desired, a second coating of the same composition may be applied whereupon the material is hardened again and glazed. The coat is very fast to rubbing and to water.

(3) A colored coating to be applied on pasteboard is prepared as follows:

| | Grams |
|---|---|
| Egg albumin solution of 15% strength | 100 |
| A solution of shellac and borax of 10% strength | 10 |
| Turkey red oil of 50% strength | 30 |
| A wax emulsion of 10% strength | 10 |
| The dyestuff Nr. 86 (Schultz, Farbstofftabellen, 7th ed. 1931) | 8 | are ground to a paste with addition of water; the whole is then made up with water to 900 grams. Shortly before use 100 grams of a solution of 5% strength of the compound

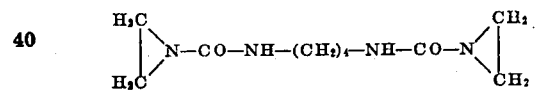

are added.

The color mixture is applied to the material by means of a brushing or dyeing machine or a spraying apparatus. In order to obtain a sufficient covering, several coatings may be applied with intermediate drying. In case an especial gloss is desired, the material may be after-treated with the following finish:

| | Grams |
|---|---|
| Egg albumin solution (15%) | 100 |
| A solution of shellac and borax (10%) | 10 |
| Turkey red oil (50%) | 5 | made up with water to 100 grams.

The material thus coated is sprayed with a solution of 5% strength of the compound named, dried and the pasteboard is ironed and calendered.

(4) A colorless coating fast to water and to rubbing is obtained on leather tanned with a vegetable tanning agent by applying the following mixture:

| | Grams |
|---|---|
| Casein solution (10%) | 50 |
| A solution of 20% strength of a salt of an interpolymer from vinylbutylether and maleic anhydride | 50 | diluted with water to 750 grams.

The coating may be applied by means of a sponge, a plushboard or with the aid of a spray gun and, if desired, the application may be repeated twice or three times. After drying, the leather is glazed and sprayed with the solution mentioned in Example 1. A solution of 5% strength of cyclohexylethylene urea may also be applied.

The finish remains glossy even if it is rubbed with a dry or moist flap.

(5) A solution of 10% strength of the ammonium salt of an interpolymer from 95 parts by weight of polyvinylacetate and 5 parts by weight of crotonic acid is applied on tightly woven fabric by means of a pencil, a brush or with the aid of a spray gun. If desired, several coats may be given. After drying, the coat is sprayed with the solution mentioned in Example 1.

Finally, the material is ironed or calendered; the coat is stable against the action of moisture.

(6) Vegetable-tanned calf which has been dyed in known manner according to the brushing-on method with aniline colors is finished with a coating color of the following composition:

| | Grams |
|---|---|
| A solution of 5% strength of hydroxy-oxethylmethyl cellulose | 100 |
| Turkey red oil | 3 |
| Glycerol | 2 |
| The dyestuff Nr. 86 (Schultz, Farbstofftabellen 7th ed.) | 15 |
| Water | 30 |

Instead of a solution of hydroxy-oxethylmethyl cellulose a solution of 5% strength of a salt of cellulose glycolic acid may be used.

The coating color is applied twice by means of a plush-board or a spray-gun. After drying, the coat is sprayed with the solution mentioned in Example 1. Finally, the following finish is applied:

| | Grams |
|---|---|
| A solution of 5% strength of hydroxy-oxethylmethyl cellulose | 200 |
| Milk | 50 |
| Fresh beef blood which has been passed through a sieve | 50 | the whole being made up with water to 1000 grams.

After drying, the finish is glazed, ironed or calendered. The coat has a vivid shade, has a good gloss and a very good fastness to water.

(7) A coat for vulcanised fiber which is fast to water is prepared as follows:

| | Grams |
|---|---|
| A solution of 10% strength of a highly viscous polyvinyl alcohol | 100 |
| Glycerol | 4 |
| Soot | 7 |
| Water | 39 |

This mixture is applied several times on the material with the aid of a spray gun until it is sufficiently coated; it is then dried and sprayed with the solution mentioned in Example 2. Finally a colorless finish of the following composition is applied:

| | Grams |
|---|---|
| A solution of 10% strength of a highly viscous polyvinyl alcohol | 150 |
| A casein solution (10%) | 100 |
| Glycerol, the whole being made up with water to 1000 grams | 5 |

After drying, the material is ironed or calendered.

(8) On colored alum-tawed goat skins the following finish is applied:

| | Grams |
|---|---|
| A solution of 10% strength of sodium polyacrylate | 100 |
| Turkey red oil | 5 |
| Talcum | 25 |
| Water | 170 |

After drying, the solution of the hardening agent mentioned in Example 3 is sprayed on the material, subsequently the same finish is once more applied and, after drying, plushed.

The coat has a mild feel and a good fastness to water.

We claim:

1. In the process of preparing coatings fast to water and rubbing, on materials of fibrous structure by covering said materials with an albumin, the improvement which comprises treating the materials with a member of the group consisting of compounds of the general formula:

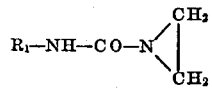

and

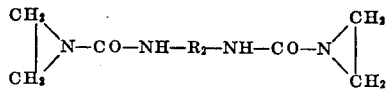

and the homologues of the said compounds, wherein $R_1$ stands for a lower aliphatic radical or for a cycloaliphatic radical and $R_2$ stands for a bivalent aliphatic or carbocyclic radical.

2. In the process of preparing coatings fast to water and rubbing on materials of fibrous structure by covering the said materials with an albumin the improvement which comprises treating the coated materials with a compound of the general formula:

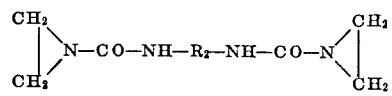

where $R_2$ stands for an alkylene radical.

3. In the process of preparing coatings fast to water and rubbing on materials of fibrous structure by covering the said materials with an albumin the improvement which comprises treating the coated materials with the compound of general formula:

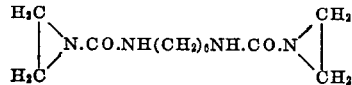

4. Materials of fibrous structure coated by means of an alubumin and after-treated by means of an agent selected from the group consisting of compounds of the general formulae:

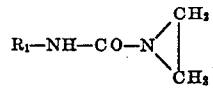

and

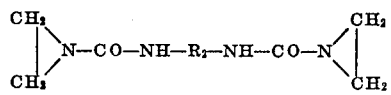

and the homologues of the said compounds, wherein $R_1$ stands for a lower aliphatic radical or for a cycloaliphatic radical, and $R_2$ stands for a bivalent aliphatic or carbocyclic radical.

5. In the process of preparing coatings fast to water and rubbing on leather by covering the leather with casein, the improvement which comprises treating the coated leather with a compound of the following formula:

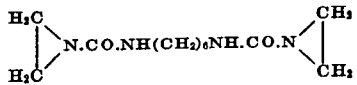

6. In a process of preparing coatings fast to water and rubbing on cardboard by covering the cardboard with egg albumen, the improvement which comprises treating the coated cardboard with a compound of the following formula:

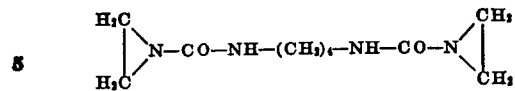

7. In a process of preparing coatings fast to water and rubbing on leather by covering the leather with casein, the improvement which comprises treating the coated leather with cyclohexylethylene urea.

WALTER PENSE.
HERBERT BESTIAN.